(12) United States Patent
Karroumi et al.

(10) Patent No.: US 8,259,934 B2
(45) Date of Patent: Sep. 4, 2012

(54) METHODS AND DEVICES FOR A CHAINED ENCRYPTION MODE

(75) Inventors: Mohamed Karroumi, Rennes (FR); Stéphane Onno, Saint-Gregoire (FR); Antoine Monsifrot, Rennes (FR)

(73) Assignee: Thomson Licensing (FR)

( * ) Notice: Subject to any disclaimer, the term of this patent is extended or adjusted under 35 U.S.C. 154(b) by 352 days.

(21) Appl. No.: 12/592,696

(22) Filed: Dec. 1, 2009

(65) Prior Publication Data

US 2010/0150344 A1    Jun. 17, 2010

(30) Foreign Application Priority Data

Dec. 15, 2008 (EP) ..................................... 08305947

(51) Int. Cl.
*H04K 1/00* (2006.01)
(52) U.S. Cl. ........................................................ 380/37
(58) Field of Classification Search .................... 380/37, 380/42, 44, 28, 27
See application file for complete search history.

(56) References Cited

U.S. PATENT DOCUMENTS

2003/0056118 A1* 3/2003 Troyansky et al. ........... 713/201
2007/0253549 A1* 11/2007 Celikkan et al. ............... 380/42

FOREIGN PATENT DOCUMENTS

WO    WO2007/118829    10/2007

OTHER PUBLICATIONS

Bruce Schneier: "Applied cryptography Second Edition" 1996, John Wiley & Sons, Inc. USA p. 193-p. 196, p. 200-p. 2009.
Search Report dated Jun. 17, 2009.

* cited by examiner

*Primary Examiner* — Edward Zee
(74) *Attorney, Agent, or Firm* — Jack Schwartz & Associates, PLLC

(57) ABSTRACT

An encryption chaining mode takes plaintext block N, generates encryption key N by combining, preferably by XOR, encryption key N-1 and plaintext block N-1 and encrypts plaintext block N using an encryption algorithm with encryption key N to output ciphertext block N. Encryption key for the first plaitnext block is generated by XOR-ing a random Initialization vector and a random intialization key K. In a preferred embodiment, initialization key K is subkeys resulting form a key schedule algorithm and encryption key N-1 is only one of the subkeys. Encryption key for the first plaintext block is generated by XOR-ing a random Initialization vector and one subkey resulting form a key schedule algorithm. Also provided is a corresponding decryption method, an encryption device, a decryption device.

10 Claims, 8 Drawing Sheets

METHODS AND DEVICES FOR A CHAINED ENCRYPTION MODE

This application claims the benefit, under 35 U.S.C. §119 of EP Patent Application 08305947.7, filed Dec 15, 2008.

FIELD OF THE INVENTION

The present invention relates generally to encryption, and in particular to chained encryption of data in blocks.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

There are many conventional encryption modes for encrypting and protecting digital data such as text, audio, and video. Most of these modes divide the data to encrypt into blocks and include a chaining step. Examples of such modes are Cipher Block Chaining (CBC), Cipher FeedBack Mode (CFB), and Output FeedBack Mode (OFB). A common feature of these modes is that the chaining step is based on the previous encrypted data block. A description of these modes may for instance be found in "Applied Cryptography Second Edition", by Bruce Schneier, 1996, John Wiley & Sons, Inc. USA For example, CBC, is also described in WO 2007/118829 and illustrated in FIG. 1, uses the previous encrypted data block to encrypt the current data block. FIG. 1 shows how a first data block "Plaintext block 1" is XOR-ed with an initialization vector IV, and how the output is encrypted using the Advanced Encryption Standard (AES) algorithm and a key to produce a first encrypted data block "Cipherblock 1". It is this first encrypted data block that is XOR-ed with the next data block "Plaintext block 2" during the encryption of this next data block. The process is repeated until the last data block has been encrypted. Decryption is performed the other way, i.e. the first encrypted data block is decrypted using AES and the key, and the output is XOR-ed with the IV to obtain the first data block.

WO 2007/118829 also describes Plaintext Block Chaining (PCB), in which the key used for encryption instead is generated from the previous plaintext block and an encryption key that is identical for all the whole encryption. This prior art document also describes alternating CBC and PCB for encryption of plaintext blocks.

While any change in the CBC plaintext propagates indefinitely, changes in the ciphertext do not. In order to overcome this drawback, the Propagating Cipher Block Chaining Mode (PCBC) was developed. PCBC is illustrated in FIG. 2.

PCBC may be said to be CBC where each plaintext block to be encrypted is first XOR-ed with the previous plaintext block. As can be seen, plaintext block 2 is first XOR-ed with plaintext block 1 and the output is then processed as in CBC, i.e. it is XOR-ed with the previous ciphertext block "ciphertext block 1", which is encrypted to generate ciphertext block 2 that is used in an XOR operation for the next plaintext block. The first plaintext block is, in essence, XOR-ed with an empty block, as there is no previous plaintext block.

It has however been discovered that swapping blocks does not affect plaintext blocks beyond the swapped blocks, which means that the changes are not propagated infinitely.

To overcome this drawback, a mode called Modified PCBC (MPCBC) has been proposed. MPCBC is illustrated in FIG. 3. The mode modifies PCBC by changing the location of the XOR with the previous plaintext block from before the encryption to after the encryption. As can be seen, a plaintext block "Plaintext Block 2" is XOR-ed with the previous ciphertext block "Ciphertext Block 1" to provide input for the encryption, and the encrypted output is then XOR-ed with the previous plaintext block "Plaintext Block 1" so as to give the ciphertext "Ciphertext Block 2".

While it would appear that MPCBC works well, the skilled person will appreciate that cryptographic protocols are sensitive, in the sense that a protocol that is believed to be safe may actually comprise an unexpected security breach.

It will therefore be appreciated that there is a need for an encryption mode that provides an alternative to the solutions of the drawbacks of the prior art. This invention provides such an alternative.

SUMMARY OF THE INVENTION

In a first aspect, the invention is directed to a method of generating a key for encrypting a present plaintext block of digital data, the present plaintext block belonging to an ordered series of at least two plaintext blocks. A device retrieves the present plaintext block and generates a second encryption key for the present plaintext block by combining a previous plaintext block with a first encryption key.

In a first preferred embodiment, the first encryption key is an initialization encryption key.

In a second preferred embodiment, the first encryption key is the encryption key that was used for encryption of the previous plaintext block, the previous plaintext block being the plaintext block that immediately precedes the present plaintext block in the ordered series.

In a second aspect, the invention is directed to a method of encrypting a present plaintext block of digital data, the present plaintext block belonging to an ordered series of at least two plaintext blocks. An encryption device obtains an encryption key using the method the first aspect of the invention and encrypts the present plaintext block using an encryption algorithm with the generated encryption key.

In a third aspect, the invention is directed to a method of generating a key for decrypting a present ciphertext block of digital data, the present ciphertext block belonging to an ordered series of at least two ciphertext blocks. A decryption device retrieves the present ciphertext block and generates a second decryption key for the present ciphertext block by combining a previously obtained plaintext block with a first decryption key.

In a first preferred embodiment, the first decryption key is a decryption key that was used to obtain the previous plaintext block, the previous plaintext block corresponding to the ciphertext block that immediately precedes the present ciphertext block in the ordered series.

In a second preferred embodiment, the second decryption key generation step, a one-way function is applied to the previously obtained plaintext block before the combination.

In a third preferred embodiment, the decryption key that was used for decryption of the previous plaintext block is a subkey of a plurality of subkeys resulting from a key schedule algorithm or a subkey of a plurality of subkeys used for decryption of the previous plaintext block.

In a fourth aspect, the invention is directed to a method of decrypting a present ciphertext block of digital data, the present ciphertext block belonging to an ordered series of at least two ciphertext blocks. A decryption device obtains a decryption key using the method of the third aspect and decrypts the present ciphertext block using a decryption algorithm with the generated decryption key.

In a fifth aspect, the invention is directed to a device for generating an encryption key for encrypting a present plaintext block of digital data, the present plaintext block belonging to an ordered series of at least two plaintext blocks. The device comprises a communication unit adapted to retrieve the present plaintext block and a processor adapted to generate a second encryption key for the present plaintext block by combining a previous plaintext block with a first encryption key.

In a sixth aspect, the invention is directed to a device for generating a decryption key for decrypting a present ciphertext block of digital data, the present ciphertext block belonging to an ordered series of at least two ciphertext blocks. The device comprises a communication unit adapted to retrieve the present ciphertext block and a processor adapted to generate a second decryption key for the present ciphertext block by combining a previously obtained plaintext block with a first decryption key.

In a preferred embodiment, a plurality of subkeys are used to decrypt a ciphertext block and the processor is adapted to find which at least one subkey from the plurality of subkeys to combine with the previous plaintext block.

BRIEF DESCRIPTION OF THE DRAWINGS

Preferred features of the present invention will now be described, by way of non-limiting example, with reference to the accompanying drawings, in which.

PREFERRED EMBODIMENT OF THE INVENTION

The present invention is directed to a method of generating encryption keys for encrypting a present plaintext block of digital data that belongs to an ordered series of at least two plaintext blocks. The present plaintext block is retrieved and a second encryption key for the present plaintext block is generated by combining a previous plaintext block with a first encryption key.

The present invention comes in at least two variants: an iterative variant and a non-iterative variant. In the iterative variant, the first encryption key is an encryption key that was used to encrypt the previous plaintext block, the previous plaintext block being the plaintext block that immediately precedes the present plaintext block in the ordered series. In the non-iterative, the first encryption key is an initialization encryption key, which remains constant for the generation of encryption keys for at least two plaintext blocks. At the decryption side, these variants also apply for the generation of decryption keys.

Figure 1:
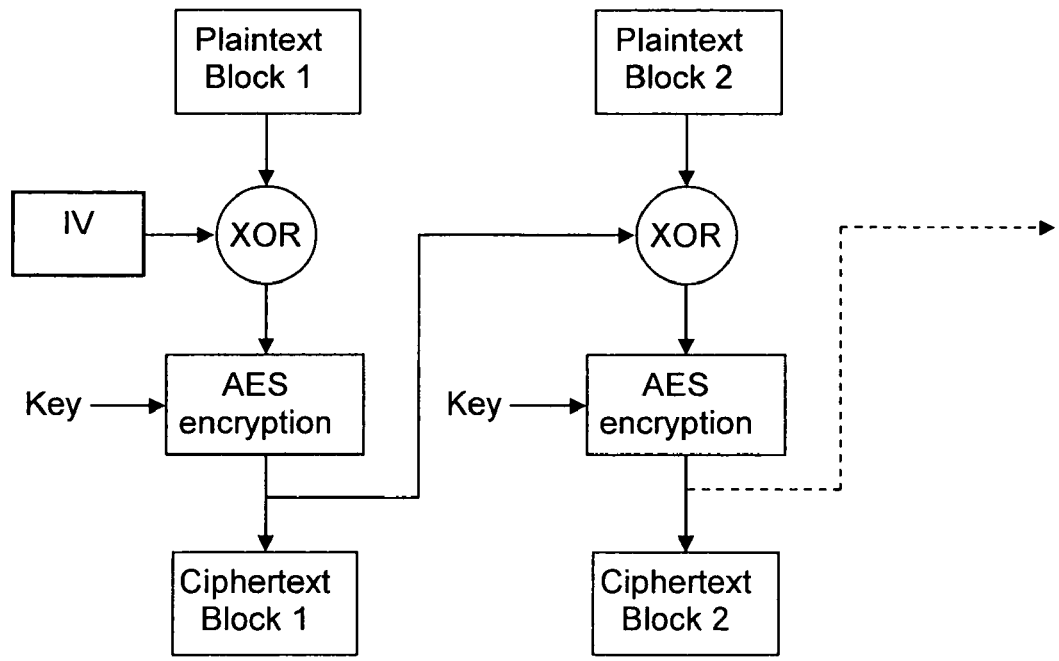
FIG. 1, already described, illustrates the prior art Cipher Block Chaining (CBC) mode.
Figure 2:
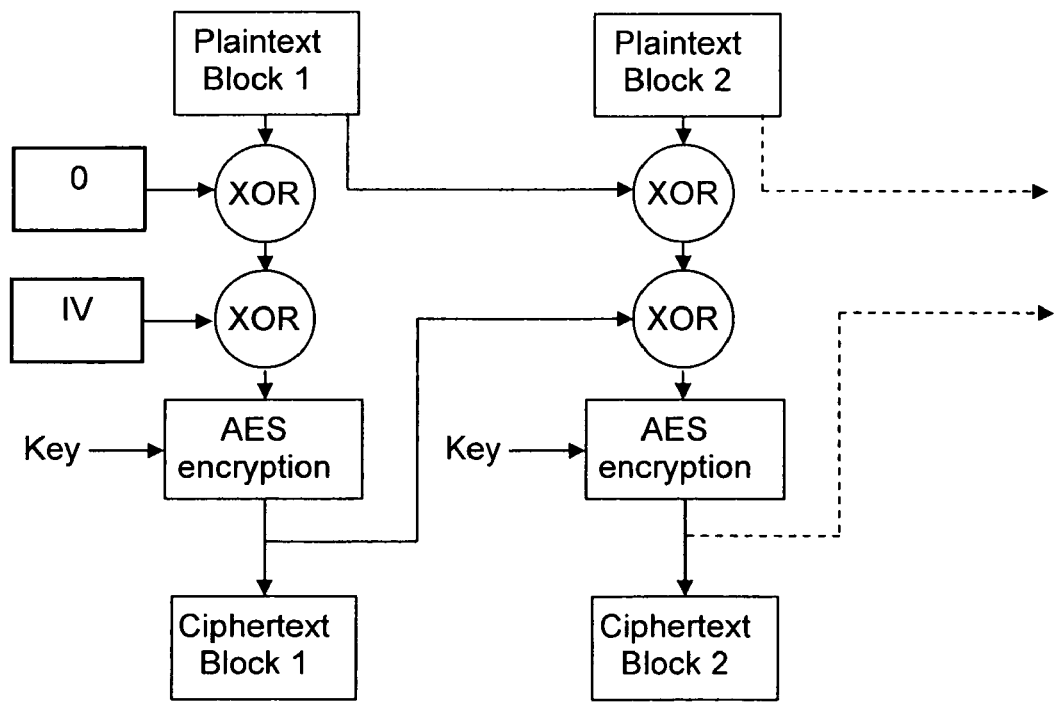
FIG. 2, already described, illustrates the prior art Propagating Cipher Block Chaining (PCBC) mode.
Figure 3:
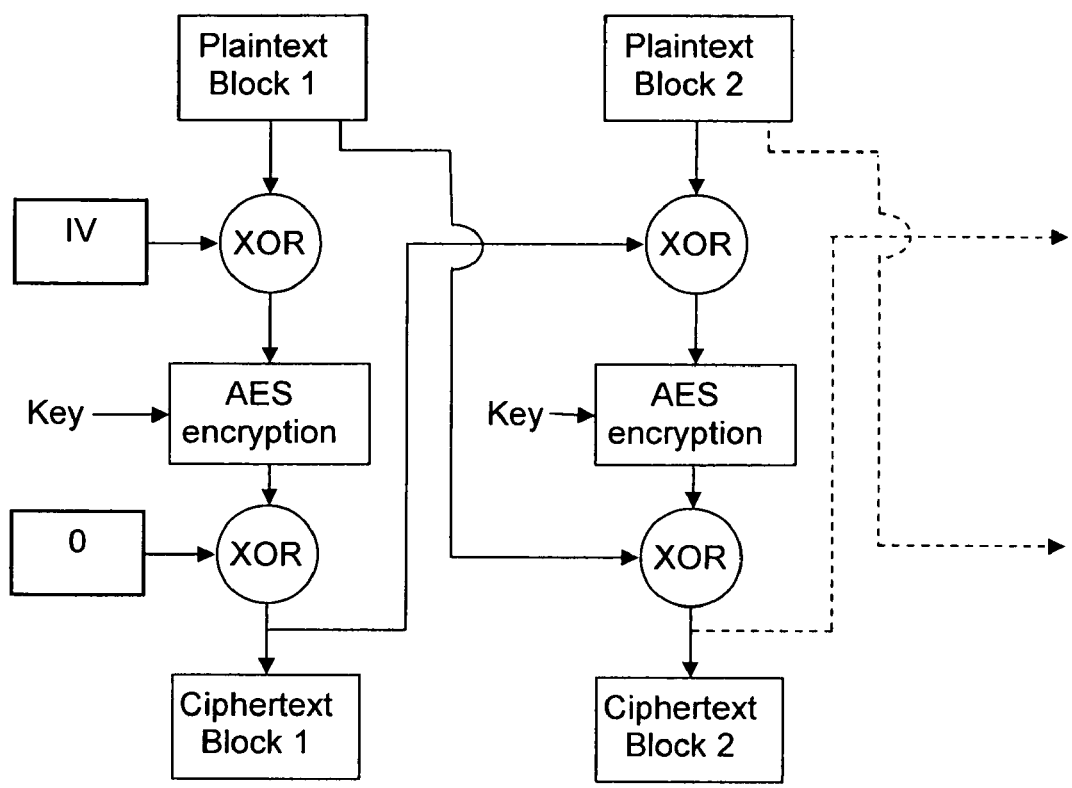
FIG. 3, already described, illustrates the prior art Modified Propagating Cipher Block Chaining (MPCBC) mode.
Figure 4:
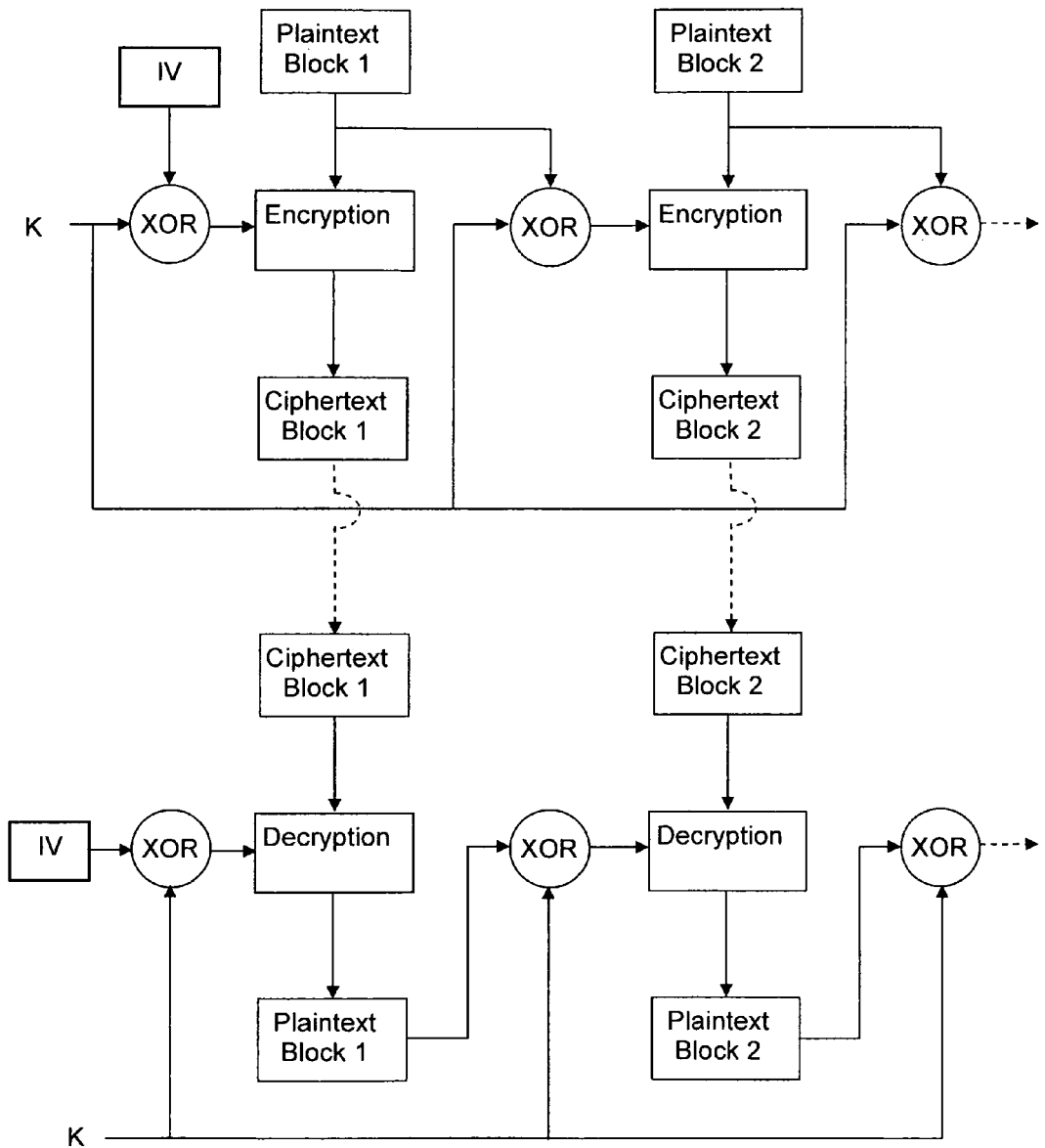
FIG. 4 illustrates a chaining mode according to a first preferred embodiment of the present invention.

FIG. 4 illustrates a chaining mode according to a first preferred embodiment of the present invention, "the non-iterative variant". The upper half of the figure illustrates encryption and the lower half of the figure illustrates decryption.

The first plaintext block, "Plaintext Block 1", has to be treated in a special manner, as there is no preceding plaintext block. To this end, just as in the prior art, the method in FIG. 4 uses a preferably random initialization key K and a preferably random initialization vector IV that are already known. The IV can be sent in non-protected form while the key has to be securely transmitted to a receiver of the encrypted content. The person skilled in the art will appreciate that key K may for example be transmitted to the receiver encrypted with a receiver's device key. This encryption step may be performed using public key cryptography or symmetric key cryptography. If it is done with symmetric key, then this invention may also be used for encryption of the initialization key K.

Plaintext block 1 is encrypted using an encryption key that results from the initialization key K XORed with a random IV, so as to generate ciphertext block 1. Each subsequent plaintext block is encrypted using a new encryption key that is obtained by XOR-ing the previous plaintext block and the initialization key K. The obtained ciphertext blocks may be transmitted one by one as soon as they are encrypted, but it is also possible to group two or more (up to all) ciphertext blocks for transmission.

Ciphertext block 1 is decrypted using a decryption key that results from the XOR between initialization key K and the IV, so as to generate plaintext block 1. Each subsequent ciphertext block is decrypted using a new decryption key that is obtained by XOR-ing the previous generated plaintext block and the initialization key K.

The skilled person will appreciate that the encryption key and the decryption key are advantageously identical.

It can be noted that while the decryption process can only be done in an order defined at the encryption time, for instance ciphertext block 1, then ciphertext block 2, . . . , ciphertext block N, the encryption process can be done in any order in this first preferred embodiment, as the encryption key depends on at least the previous plaintext block and one basic key, such as an initialization key. It could be done for example in reverse order i.e. encrypting first ciphertext block N, then ciphertext block N-1, . . . , ciphertext block 1. This does not affect the order at the decryption time, which remains ciphertext block 1, then ciphertext block 2, . . . , ciphertext block N. This is possible as it is the plaintext block that is used to modify the encryption key.

Figure 5:
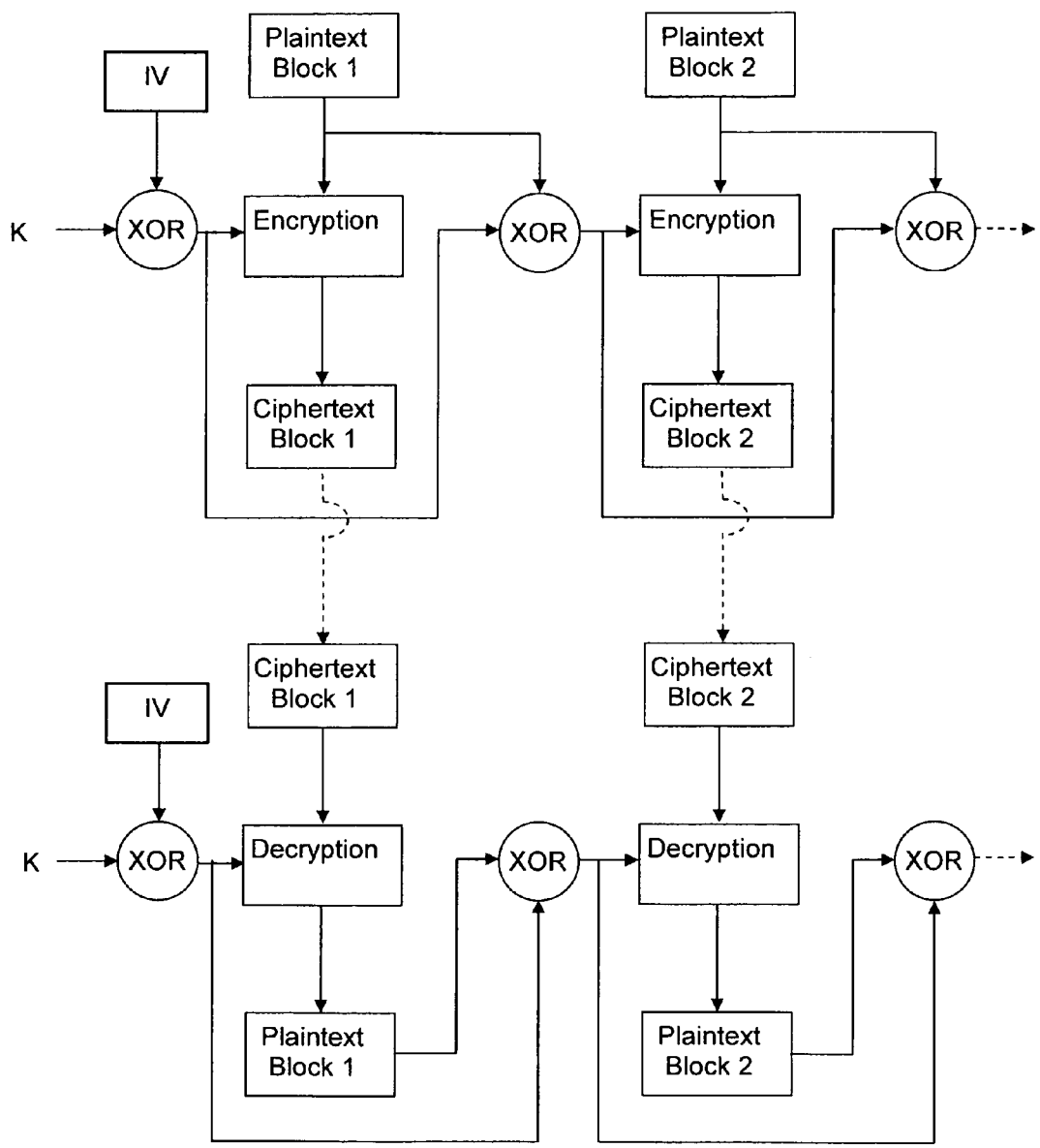
FIG. 5 illustrates a chaining mode according to a second preferred embodiment of the present invention.

FIG. 5 illustrates a chaining mode according to a second preferred embodiment of the present invention, "the iterative variant". The upper half of the figure illustrates encryption and the lower half of the figure illustrates decryption.

The first plaintext block, "Plaintext Block 1", has to be treated in a special manner, as there is no preceding plaintext block. To this end, just as in the prior art, the method in FIGS. 5 and 6 uses a preferably random initialization key K and a preferably random initialization vector IV that are already known. The IV can be sent in non-protected form while the key has to be securely transmitted to a receiver of the encrypted content. The person skilled in the art will appreciate that key K may for example be transmitted to the receiver encrypted with a receiver's device key. This encryption step may be performed using public key cryptography or symmetric key cryptography. If it is done with symmetric key, then this invention may also be used for encryption of the initialization key K.

Plaintext block 1 is encrypted using an encryption key that results from the initialization key K XORed with a random IV, so as to generate ciphertext block 1. Each subsequent plaintext block is encrypted using a new encryption key that is obtained by XOR-ing the previous plaintext block and the key used to encrypt the previous plaintext block. The obtained ciphertext blocks may be transmitted one by one as soon as they are encrypted, but it is also possible to group two or more (up to all) ciphertext blocks for transmission.

Ciphertext block 1 is decrypted using a decryption key that results from the XOR between initialization key K and the IV, so as to generate plaintext block 1. Each subsequent ciphertext block is decrypted using a new decryption key that is obtained by XOR-ing the previous generated plaintext block and the key used to decrypt the previous ciphertext block.

The skilled person will appreciate that the encryption key and the decryption key are advantageously identical.

The iterative and non-iterative variant can be implemented in different ways. For example, any block cipher algorithm can be used for encryption and decryption; the preferred algorithm is AES. Another example is to use another function than XOR to combine the key and the plaintext block, such as addition modulo $2^x$, where x is the bit length of the key K. It is also possible to modify the plaintext block, for example by application of a one-way function, before it is combined with the key.

Figure 6:
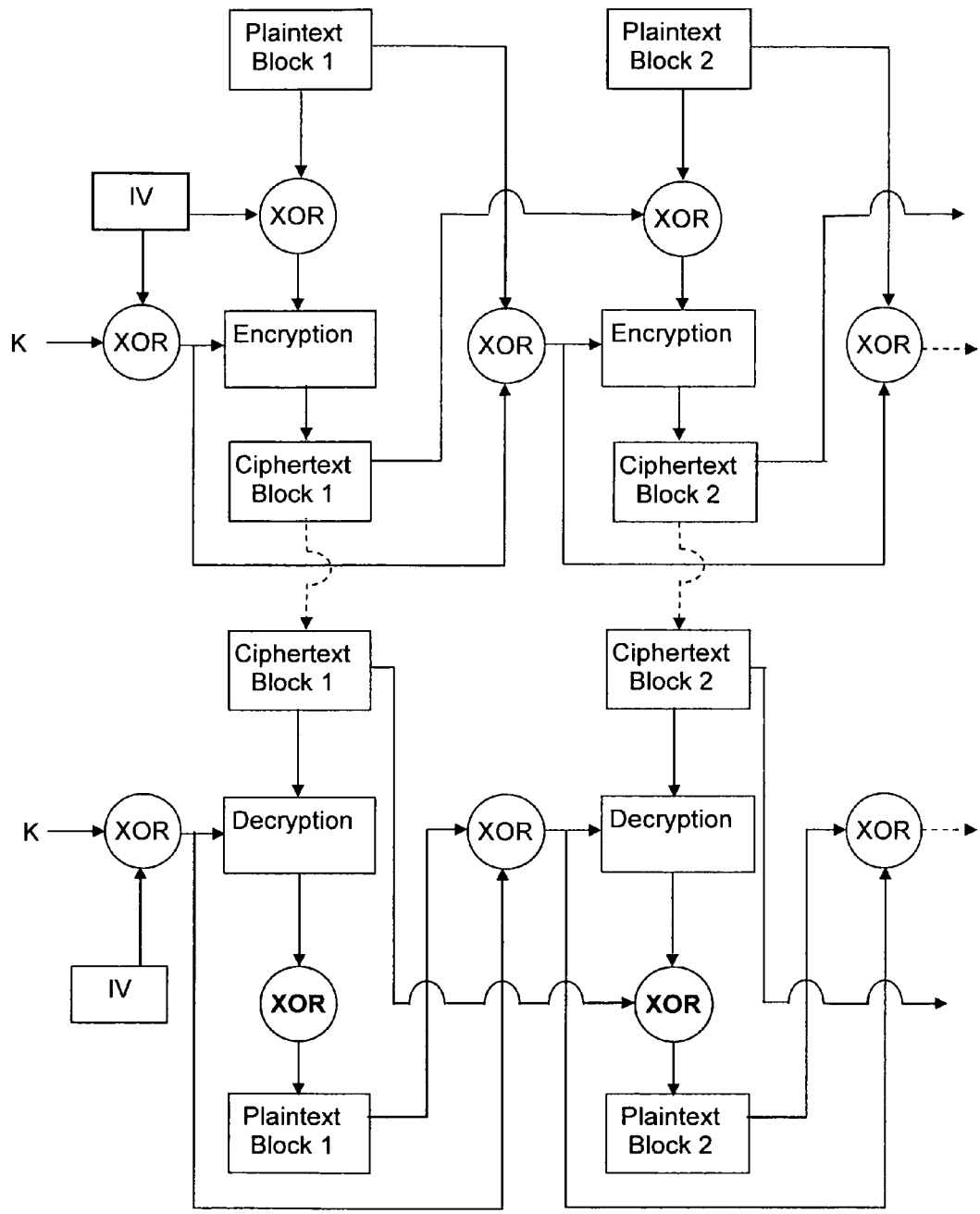
FIG. 6 illustrates a chaining mode according to a variant embodiment of the present invention.

Also, the present invention can be combined with any other block chaining mode operation like CBC. If combined with CBC mode, the present invention provides an interesting alternative to Modified Propagating Cipher Block Chaining Mode (MPCBC). The combination of the second preferred embodiment of the method and the CBC is illustrated in FIG. 6. As can be seen, an added feature compared to FIG. 5 is that a plaintext block is combined (by XOR) with the previous ciphertext block before encryption.

In the following is described a particular mechanism that can make the proposed chaining mode even more efficient and more secure. The mechanism works for the two embodiments of the method of generating the encryption/decryption key, iterative and non-iterative. The description is given here for the iterative embodiment as it is more complex than the non-iterative embodiment.

Figure 7:
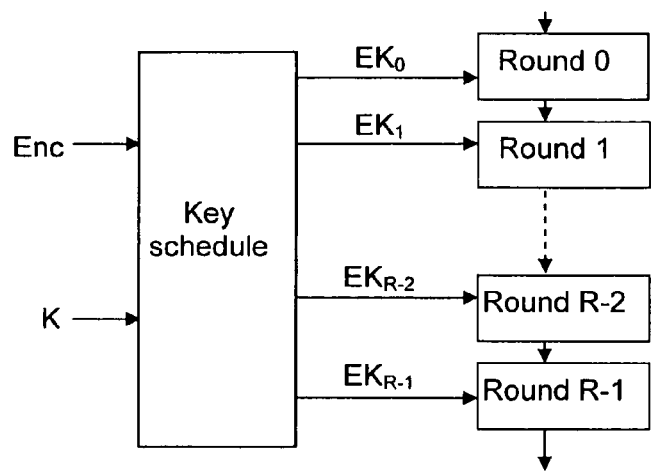
FIG. 7 illustrates a key schedule algorithm.

Encryption of data is generally done in "rounds" within block cipher algorithms. Each round uses a round key or a subkey to process the data. The setup of each round is the same, except for the subkey that is changed, i.e. the data is iteratively encrypted in each round. Therefore, most of the block ciphers include a key schedule algorithm that calculates the subkeys from a master key K. More precisely, a key schedule algorithm processes the key K and a direction ("encrypt" or "decrypt") and produces a sequence of R subkeys $EK_0, EK_1, \ldots, EK_{R-1}$, if the direction is encrypt or $DK_0, DK_1, \ldots, DK_{R-1}$, if the direction is decrypt. Encryption is performed through the R round as depicted in FIG. 7. Some block ciphers like Tiny Encryption Algorithm (TEA) have simple key schedules where a 128-bit master key K is split into four 32-bit round keys and used repeatedly in successive rounds. Other block ciphers use more complicated key schedules; this is the case for AES, which expands a key K into several rounds keys that has same length as master key K.

When encrypting several blocks with the same key K, the key schedule algorithm is generally called once at the beginning, before encryption of the first plaintext block. Encryption of successive plaintext blocks is done using previously computed subkeys. This is how it is done in prior art methods like CBC or PCBC. In this invention, given that the key changes for the encryption of each block, the key schedule algorithm has to be executed several times; as many as the total number of plaintext blocks. This introduces a delay on the performance and slows down encryption/decryption speed, something that may be unwanted.

It would thus be advantageous to have a variant embodiment of the method that avoids this drawback. Instead of combining the key, we combine at least one subkey with a preceding plaintext block. For instance, the XOR operation is done between at least one subkey used to encrypt/decrypt a preceding block with the preceding plaintext block itself.

Figure 8:
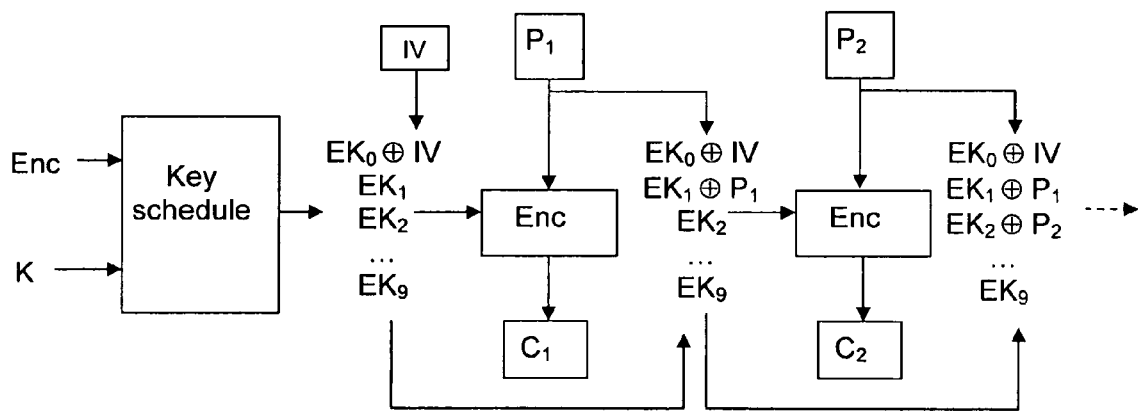
FIG. 8 illustrates a further variant embodiment of the method according to the invention.

FIG. 8 illustrates the variant embodiment of the method according to the invention using AES. The 128-bit version of AES expands a 128-bit key K into ten 128-bit subkeys $EK_0$, $EK_1$, $EK_9$ through the key schedule algorithm when the direction is encrypt. Plaintext block 1 is iteratively encrypted using 10 subkeys, were the first subkey results from a XOR between $EK_0$ and the IV and all other subkeys $EK_i$ where i≠0 remain identical to the subkeys originally generated by the key schedule. Each subsequent plaintext block N is iteratively encrypted using new encryption subkeys that are obtained by taking the previous subkeys (used to encrypt the previous plaintext block) and XOR-ing the previous plaintext block N-1 with the subkey $EK_n$ where n is the remainder of the division of N-1 by 10 (i.e. n=N-1%10). All other subkeys $EK_i$ where i≠n remain identical to subkeys $EK_i$ encrypting previous plaintext block. For example, FIG. 8 shows how the initial subkeys $EK_0$ to $EK_9$ are modified for each plaintext block; only $EK_0$ is modified for plaintext block 1, and only $EK_1$ is further modified for plaintext block 2 and so on.

During decryption, the key K is expanded through the key schedule algorithm into ten 128-bit subkeys $DK_0, DK_1, \ldots, DK_9$. Ciphertext block 1 is iteratively decrypted using the 10 subkeys, where the first subkey results from a XOR between $DK_0$ and the IV and all other subkeys $DK_i$ with i≠0 are identical to subkeys generated by the key schedule to generate plaintext block 1. Each subsequent ciphertext block N is iteratively decrypted using new decryption subkeys that are obtained by taking the previous subkeys (used to decrypt the previous ciphertext block) and XOR-ing the previous plaintext block N-1 with the subkey $DK_n$ where n is the remainder of the division of N-1 by 10 (i.e. n=N-1%10). All other subkeys $DK_i$ where i≠n remain identical to subkeys $DK_i$ decrypting previous ciphertext block.

Given that the decryption process can only be done in a predefined order (first ciphertext block 1 then ciphertext block 2, etc), the decryption device is able to know which subkey it should combine with the previous plaintext block for the decryption of a given ciphertext block. A counter/variable may be used to point to the right subkey after each block decryption operation.

Modifying only one subkey by XOR-ing it with previous plaintext at each block encryption enables having no more operations than classical chaining modes (there is only one XOR operation added at each block encryption). It will thus be appreciated that this variant embodiment is as efficient as prior art chaining modes.

The method can be generalized to a block cipher that expands the key K to any number of subkeys. If the total number of subkeys is R then each block N is encrypted/decrypted using new subkeys that are obtained by taking the previous subkeys (used to encrypt/decrypt the previous block) and XOR-ing the previous plaintext block N-1 with the subkey $EK_n/DK_n$ where n is the remain of the division of N-1 by R (i.e. n=N-1% R).

In another variant, the encryption/decryption subkeys are generated by XOR-ing all previous subkeys used to encrypt/decrypt the previous ciphertext block with previous plaintext block N-1. For the first plaintext/ciphertext block the encryption/decryption subkeys are all XOR-ed with the initialization vector IV.

In another variant, the encryption/decryption subkeys are generated by XOR-ing always the same subkey, say $EK_0/DK_0$, with previous plaintext block N-1 and for the first block $EK_0/DK_0$ is XOR-ed with the IV.

In a further variant, the encryption/decryption subkeys are generated, using any combination of at least two previous subkeys $(EK_i, EK_j)/(DK_i, DK_j)$ (used to encrypt/decrypt the previous ciphertext block) together with previous plaintext block. The combination operation may use, but is not restricted to, any one-way function.

From security point of view, some block cipher algorithms suffer from related-key attacks due to a weakness in their key schedule. This is the case for Tiny Encryption Algorithm (TEA) that was designed to minimize memory footprint, and maximize speed. TEA weaknesses arise from the overly simple design of its key schedule algorithm.

To prevent related-key attack on block ciphers, a strong key schedule is preferred. It should have the following properties:
  Property 1: Given any subkey it should be infeasible to get back to the other subkeys or to the master key K just by inverting the functions used. Property 2: It should eliminate bit leakage between subkeys and master key K.

The second property ensures that for example subkey $EK_i$ and subkey $EK_{i-1}$ or subkey $EK_{i+1}$ do not have a lot of bit information in common. As some attacks make use of the relations between subkeys, these would have a higher complexity if these relations did not exist.

Using the method according to the present invention, the key schedule output would not depend only the key K but also on the plaintext to encrypt. This makes a key schedule more difficult to invert if the plaintext is not known. This is what is expected by Property 1. In other words, mixing a vulnerable key schedule output with some plaintext blocks makes the key schedule less vulnerable.

Furthermore, changing the subkey that is modified at each block encryption enables Property 2. Indeed, If the key schedule is vulnerable and produces for the encryption of block N two subkeys $EK_{n-1}$ and $EK_n$ that have a lot of bit information in common then the couple ($EK_{n-1}$ XOR $P_{n-1}$ and $EK_n$ XOR $P_n$) would have less information in common, as the two plaintext blocks $P_{n-1}$ and $P_n$ are likely to be different. This is what it is done when subkeys $EK_n/DK_n$ are modified at each block encryption/decryption (where n=N-1% R and R is number of rounds in the block cipher algorithm). This way, common information between two subkeys and even between a subkey and the master key K is eliminated.

Besides, to set up an attack in practice often requires a huge number of ciphertexts, for which plaintexts are different but encrypted with the same key. With prior art methods, when encrypting long messages, these are split in different blocks and encrypted with the same key. This may then help when gathering the amount of needed ciphertexts to carry-out the attack. The method according to the present invention makes this much more difficult, as the key changes for the encryption of each block for long messages.

Figure 9:
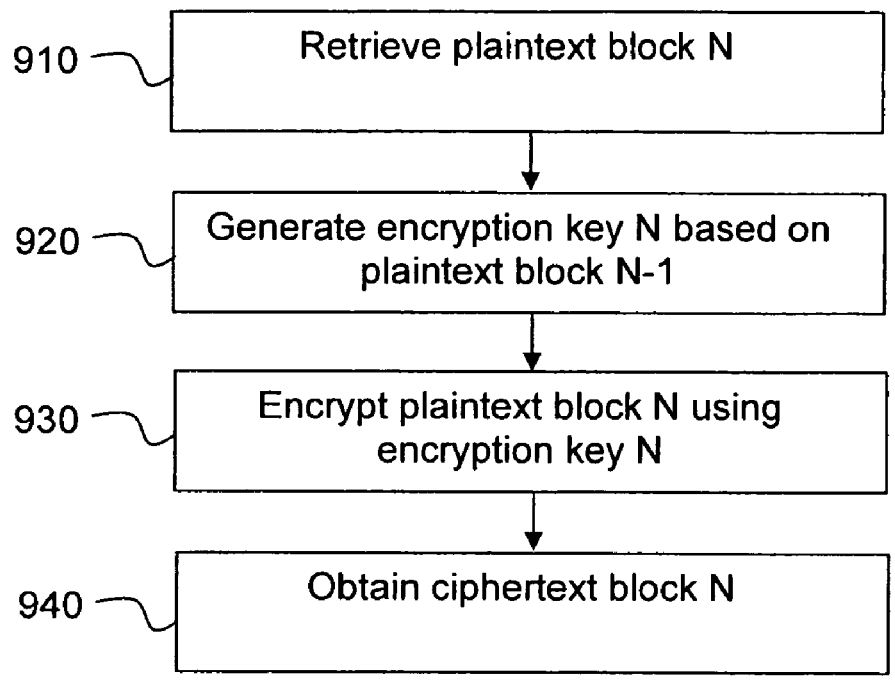
FIG. 9 illustrates a method of encryption of a plaintext block according to a preferred embodiment of the chaining mode of the present invention.

FIG. 9 further illustrates the general encryption method according to a preferred embodiment of the invention. In FIG. 9, a single plaintext block is encrypted, but it will be appreciated that it is possible to generalise the method by iteration. First, plaintext block N is retrieved 910 and encryption key N is generated 920 using plaintext block N-1 and encryption key N-1. In a preferred embodiment, plaintext block N-1 and encryption key N-1 are combined using XOR. It will be appreciated that step 910 may just as well occur after step 920. Then, plaintext block N is encrypted 930 using an encryption algorithm and encryption key N, which obtains 940 ciphertext block N that may then be transmitted or stored. As mentioned, the method may then be iterated with N increased by one.

Figure 10:
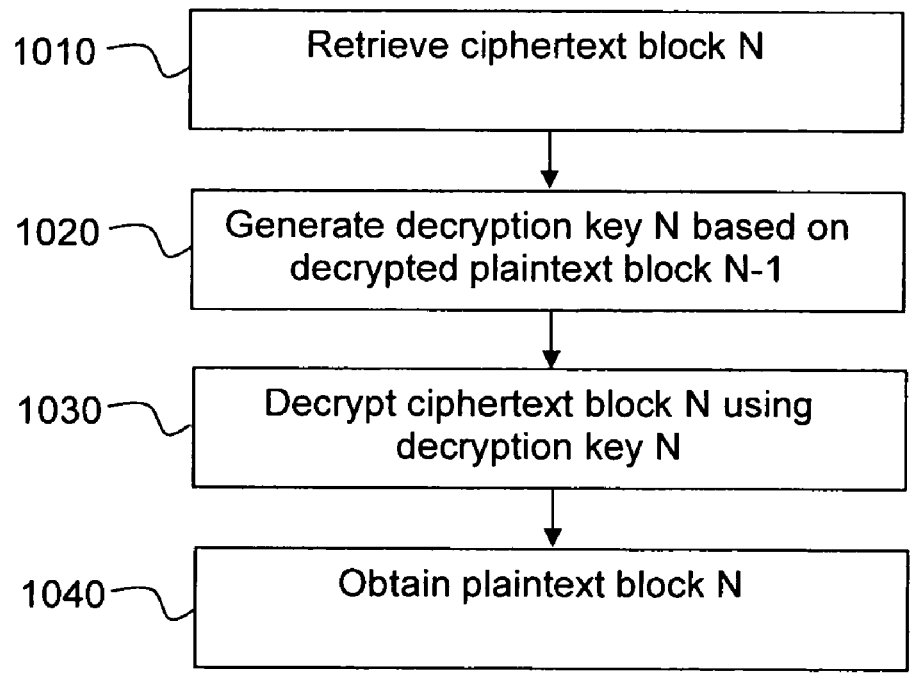
FIG. 10 illustrates a method of decryption of a plaintext block according to a preferred embodiment of the chaining mode of the present invention.

FIG. 10 further illustrates the decryption method according to a preferred embodiment of the invention. In FIG. 10, a single ciphertext block is decrypted, but it will be appreciated that it is possible to generalise the method by iteration. First, ciphertext block N is retrieved 1010 and decryption key N is generated 1020 using plaintext block N-1 and decryption key N-1. In a preferred embodiment, plaintext block N-1 and decryption key N-1 are combined using XOR. It will be appreciated that step 1010 may just as well occur after step 1020. Then, ciphertext block N is decrypted 1030 using a decryption algorithm and decryption key N, which obtains 1040 plaintext block N. As mentioned, the method may then be iterated with N increased by one.

As mentioned for the encryption method hereinbefore, the first block is decrypted using an initialization key that may be previously known by the decryption unit or received thereby before decryption begins.

Figure 11:
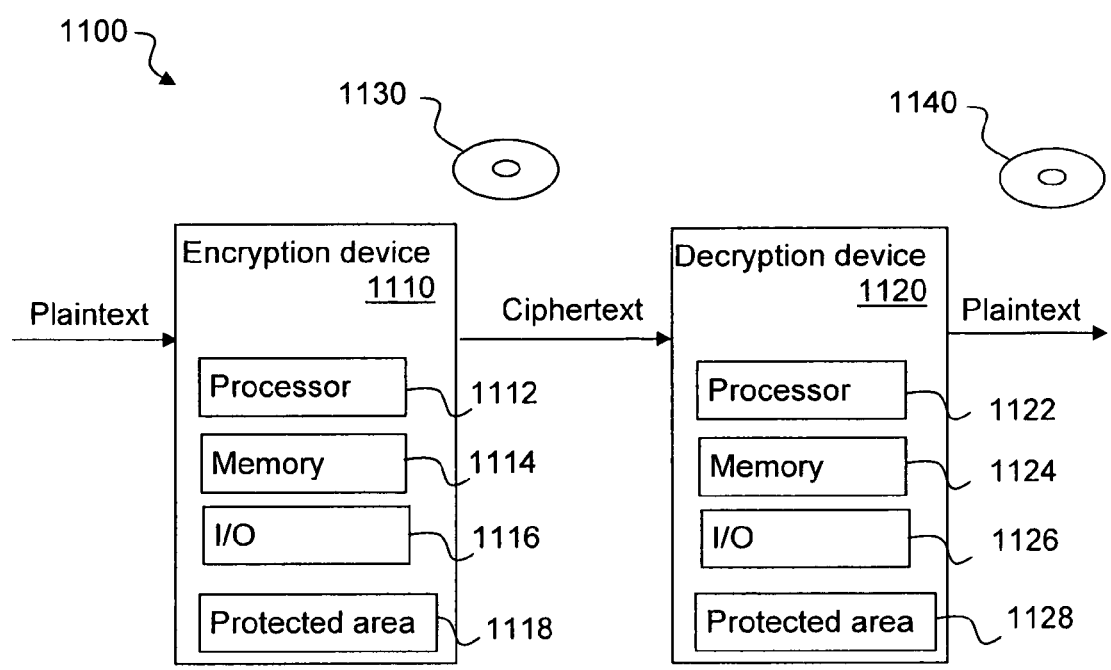
FIG. 11 illustrates devices for encryption and decryption using the chaining mode according to a preferred embodiment of the present invention.

FIG. 11 illustrates an encryption system according to a preferred embodiment of the invention. The encryption system 1100 comprises an encryption device 1110 and a decryption device 1120. The encryption device 1110 is adapted to receive plaintext, encrypt the received plaintext, and output the obtained ciphertext. Analogously, the decryption device 1120 is adapted to receive ciphertext, decrypt the received ciphertext, and output the obtained plaintext.

In more detail, the encryption device 1110 comprises at least one communication unit "I/O" 1116 adapted to receive plaintext and output ciphertext, and preferably at least one memory 1114 advantageously adapted to store plaintext, intermediary results, ciphertext and at least one encryption key. Device 1110 further comprises a protected area 1118 adapted to store one or several device secret keys. Device secret keys are used to encrypt the initialization key K before transmission. The choice of the device keys to be used by encryption device 1110 depends on the receiver of the encrypted data. The protected area 1118 is preferably resistant against software altering and physical tampering. The protected area 1118 is not necessary if initialization key K is encrypted using asymmetric cryptography, as encryption device 1110 will use public keys for the encryption. Further, the encryption device 1110 comprises a processor 1112 adapted to perform encryption of plaintext according to any of the embodiments of the method described herein.

Similarly, in more detail, the decryption device 1120 comprises at least one communication unit "I/O" 1126 adapted to receive ciphertext and output plaintext, and preferably at least one memory 1124 advantageously adapted to store plaintext, intermediary results, ciphertext and at least one decryption key. Device 1120 further comprises a protected area 1128 adapted to store a device secret key. The device secret key was previously used by encryption device 1110 to encrypt the initialization key K before being transmitted to the decryption device 1120. The protected area 1128 is preferably resistant against software altering and physical tampering. It is preferable to use the protected area 1128, because even if initialization key K is encrypted using asymmetric cryptography, decryption device 1120 will use a private key for the decryption of K and this private key needs to be protected and stored in a secure area. Further, the decryption device 1120 comprises a processor 1122 adapted to perform decryption of plaintext according to any of the embodiments of the method described herein.

Also illustrated are data storage mediums 1130, 1140 respectively storing thereon computer readable instructions that, when executed in a processor, perform the encryption method or decryption method according to any of the embodiments of the method described herein.

As will be appreciated, the present invention provides a more secure alternative to Modified Plain & Cipher Block Chaining Mode (MPCBC) while, at least in a variant embodiment, being as efficient.

Each feature disclosed in the description and (where appropriate) the claims and drawings may be provided independently or in any appropriate combination. Features described as being implemented in hardware may also be implemented in software, and vice versa.

Reference signs appearing in the claims are by way of illustration only and shall have no limiting effect on the scope of the claims.

The invention claimed is:

1. A method of generating a key for encrypting a present plaintext block of digital data, the present plaintext block belonging to an ordered series of plaintext blocks, the method comprising the steps of:
  generating, by a device, a second encryption key for the present plaintext block by combining a previous plaintext block with a first generated encryption key, wherein the first generated encryption key was used as an encryption key for encryption of the previous plaintext block and generated by combining a plaintext block immediately preceding the previous plaintext block and a third encryption key, the previous plaintext block immediately preceding the present plaintext block in the ordered series.

2. The method of claim 1, wherein the first encryption key is an initialization encryption key.

3. A method of encrypting a present plaintext block of digital data, the present plaintext block belonging to an ordered series of plaintext blocks, the method comprising the steps of:
  generating, at an encryption device, a second encryption key for the present plaintext block by combining a previous plaintext block with a first generated encryption key, wherein the first generated encryption key was used as an encryption key for encryption of the previous plaintext block and generated by combining a plaintext block immediately preceding the previous plaintext block and a third encryption key, the previous plaintext block immediately preceding the present plaintext block in the ordered series; and
  encrypting, at the encryption device, the present plaintext block using an encryption algorithm with the generated second encryption key.

4. A method of generating a key for decrypting a present ciphertext block of digital data, the present ciphertext block belong to an ordered series of ciphertext blocks, the method comprising the steps of:
  generating, by a device, a second decryption key for the present ciphertext block by combining a previously obtained plaintext block with a first generated decryption key, wherein the first generated decryption key was used as a decryption key to obtain the previously obtained plaintext block and generated by combining a plaintext block decrypted immediately prior to the previous plaintext block and a third encryption key, the previously obtained plaintext block corresponding to the ciphertext block that immediately precedes the present ciphertext block in the ordered series.

5. The method of claim 4, wherein, in the second decryption key generation step, a one-way function is applied to the previously obtained plaintext block before the combination.

6. The method of claim 4, wherein the first generated decryption key is:
  a subkey of either:
    a plurality of subkeys resulting from a key schedule algorithm; or
    a plurality of subkeys used for decryption of the previously obtained plaintext block.

7. A method of decrypting a present ciphertext block of digital data, the present ciphertext block belonging to an ordered series of ciphertext blocks, the method comprising the steps of:
  generating, at a decryption device, a decryption key by combining a previously obtained plaintext block with a first generated decryption key, wherein the first generated decryption key was used as a decryption key to obtain the previously obtained plaintext block and generated by combining a plaintext block decrypted immediately prior to the previous plaintext block and a third encryption key, the previously obtained plaintext block corresponding to the ciphertext block that immediately precedes the present ciphertext block in the ordered series; and
  decrypting, at a decryption device, the present ciphertext block using a decryption algorithm with the generated decryption key.

8. A device for generating an encryption key for encrypting a present plaintext block of digital data, the present plaintext block belonging to an ordered series of plaintext blocks, the device comprising:
  a processor configured to:
    generate a second encryption key for the present plaintext block by combining a previous plaintext block with a first generated encryption key, wherein the first generated encryption was used as an encryption key for encryption of the previous plaintext block and generated by combining a plaintext block immediately preceding the previous plaintext block and a third encryption key, the previous plaintext block immediately preceding the present plaintext block in the ordered series.

9. A device for generating a decryption key for decrypting a present ciphertext block of digital data, the present ciphertext block belonging to an ordered series of ciphertext blocks, the device comprising,
  a processor configured to:
    generate a second decryption key for the present ciphertext block by combining a previously obtained plaintext block with a first generated decryption key, wherein the first generated decryption key was used as a decryption key to obtain the previously obtained plaintext block and generated by combining a plaintext block decrypted immediately prior to the previous plaintext block and a third encryption key, the previously obtained plaintext block corresponding to the ciphertext block that immediately precedes the present ciphertext block in the ordered series.

10. The device of claim 9, wherein a plurality of subkeys are used to decrypt a ciphertext block and wherein the processor is configured to find which at least one subkey from the plurality of subkeys to combine with the previously obtained plaintext block.

* * * * *